June 7, 1949.  C. W. WICKENS  2,472,639
WIGGLER
Filed July 30, 1945

INVENTOR.
C. W. WICKENS
BY E. J. Bihenbenel
ATTORNEY

Patented June 7, 1949

2,472,639

UNITED STATES PATENT OFFICE 2,472,639

WIGGLER

Clarence W. Wickens, Portland, Oreg.

Application July 30, 1945, Serial No. 607,796

2 Claims. (Cl. 43—46)

This invention relates generally to the art of fishing, and particularly to a wiggler or a form of artificial bait or lure, employed to attract fish.

The main object of this invention is to provide an exceedingly simple and efficient form of wiggler, whereby the activities of a fish may be simulated and in which means are provided for producing a wiggling or zigzag motion through the water, and for stabilizing the action of the wiggling element, and, at the same time, providing a means for flashing or reflecting light rays in all directions.

The second object is to provide a wiggler of the class described which will be extremely rugged in construction and not easily rendered inoperative by a fish striking thereon, or by contact with rocks or snags.

Figure 1:
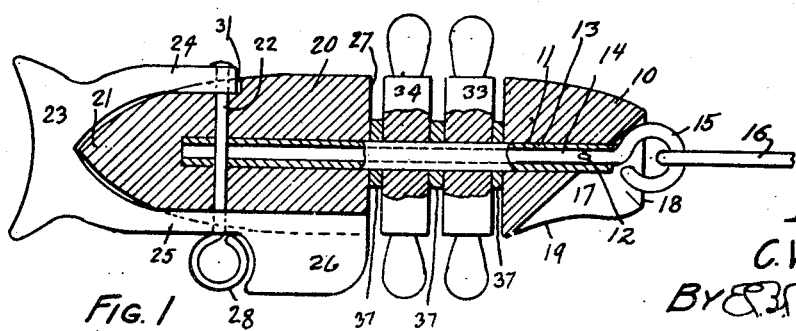

These and other objects become more apparent in the specification following:

Fig. 1 is a longitudinal section through the device.

Figure 3:
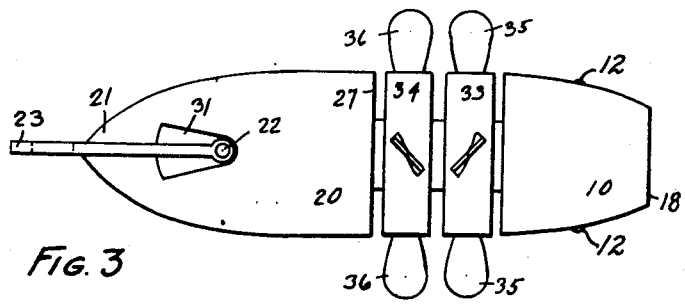
Figure 6:
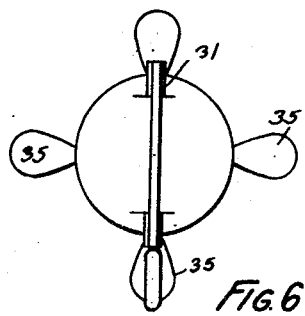
Figure 2:
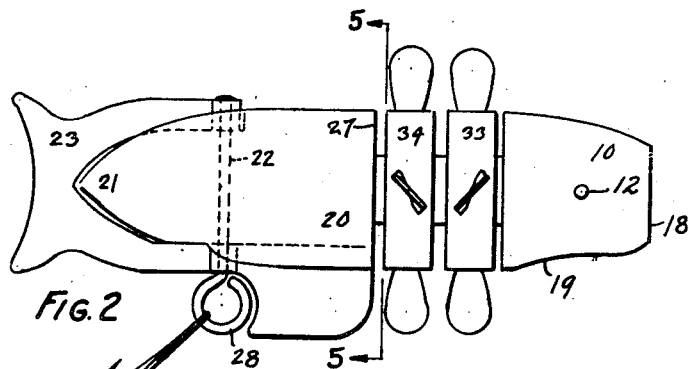
Figure 5:
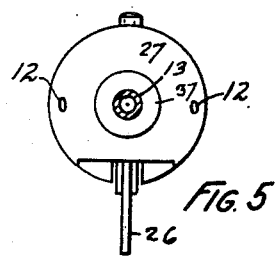
Figure 4:
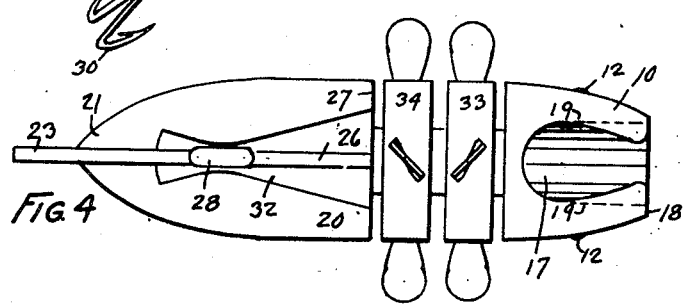
Figure 7:
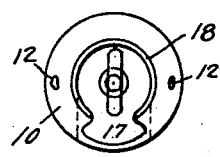

Fig. 2 is a side elevation.
Fig. 3 is a top plan view.
Fig. 4 is a bottom plan view.
Fig. 5 is a section along the line 5—5 in Fig. 2.
Fig. 6 is a tail end elevation.
Fig. 7 is a head end elevation.

Similar numerals refer to similar parts throughout the several views.

Referring in detail to the drawing, there is shown a head section 10 which is circular in cross section having an axial opening 11 along the center thereof, in which is secured by means of the pin 12, a tubular core or shaft 13 into which extends a shank 14 of an eye 15, to which a leader 16 may be attached.

A somewhat cylindrical tunnel 17 is formed in the head 10, cutting through the end 18 of the head 10, as well as the side 19 thereof. The purpose of the tunnel 17 is to deflect water downwardly for the purpose of directing it against the impellers of the spinning elements.

On the opposite end of the shank 14 is mounted a body 20 having a somewhat pointed rear end 21. A pivot pin 22 passes through the body and through the core 13, thereby securing the members 14 and 20 together.

A tail 23 has the forwardly extending arms 24 and 25 hinged on the pin 22, and the arm 25 has a rudder portion 26 extending to the forward end 27 of the body 20. On the lower end of the pin 21 is formed an eye 28 to which are secured hooks 30.

The tail 23 is so constructed that it can move easily between the lateral limits of the groove 31 formed in the top of the body 20 and the groove 32 formed in the bottom of body 20.

Between the members 10 and 20 are mounted the discs 33 and 34 provided with propeller blades 35 and 36 which are oppositely pitched, the purpose is to keep the discs 33 and 34 rotating in opposite directions.

Washers 37 are placed on each side of the members 33 and 34 on the core 13. The discs 33 and 34 must rotate freely. The operation of the device is as follows.

Assuming that suitable hooks 30 are attached to the wiggler, preferably at the eye 28, and that the wiggler is attached to the leader 16, and that water is flowing against the head 10, it follows that the water which enters the tunnel 17 will flow downwardly and rearwardly against the propellers 35 and 36 causing them to rotate in opposite directions, thereby avoiding the imparting of a rotary movement to the device.

The weight of the hooks 30 added to the weight of the lower fin 26, plus the circular motion of the water caused by the propeller blades 35 and 36 revolving in opposite directions, has a positive tendency to hold the device in an upright position.

It will be noted that the tail 23 is unbalanced by the rudder 26 which is in advance of the vertical center line of the pin 22, so that the tail 23 is constantly moved from side to side causing the wiggler to take a zigzag course through the water and to produce an attractive flashing action which is so desired by the fishermen.

The main purpose of the tunnel 17 is to cause a lifting reaction of the water against the head 10 causing the spinner to rise.

When used for dark-water fishing, it is desirable to make the body 20 of a transparent material and to coat the core 13 which projects into the body, with a luminous point, in order that it may emit light rays for the purpose of attracting the fish.

I am aware that many forms of wigglers have been constructed in the past, I therefore do not claim such devices broadly, but I do intend to cover such forms and modifications thereof, as follow fairly within the appended claims.

I claim:

1. A wiggler consisting of a core, having secured on one end thereof a body, and at the other end thereof and spaced from said body a head, a pair of oppositely propelled propellers mounted on said core between said head and body adapted to rotate in opposite directions, said head having a tunnel formed therein, adapted to divert water against said propellers, and means for stabilizing said body.

2. A wiggler consisting of a central axle, oppositely pitched propellers mounted on said axle, a head mounted in front of said axle having a tunnel formed therein for diverting a stream of water against said propellers, a body mounted on said axle behind said propellers, a tail mounted on said body on a vertical pivot and having limited lateral movement, and a fin forming part of said tail and extending in front of its vertical pivot and constituting a means for unbalancing said tail as the wiggler passes through the water.

CLARENCE W. WICKENS.

REFERENCES CITED

The following references are of record in the file of this patent:

UNITED STATES PATENTS

| Number | Name | Date |
|---|---|---|
| 667,257 | Shakespeare et al. | Feb. 5, 1901 |
| 781,794 | Smith | Feb. 7, 1905 |
| 1,109,439 | Maus | Sept. 1, 1914 |
| 1,155,883 | Burkman | Oct. 5, 1915 |
| 1,209,641 | Olds | Dec. 19, 1916 |
| 1,778,214 | Fisher | Oct. 14, 1930 |